(12) United States Patent
Choi

(10) Patent No.: US 9,395,237 B2
(45) Date of Patent: Jul. 19, 2016

(54) IMAGE SENSOR MODULE HAVING CURVED INFRARED CUT-OFF FILTER

(71) Applicant: Samsung Electronics Co., Ltd, Gyeonggi-do (KR)

(72) Inventor: Sung-Wook Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 13/890,072

(22) Filed: May 8, 2013

(65) Prior Publication Data

US 2013/0300921 A1   Nov. 14, 2013

(30) Foreign Application Priority Data

May 10, 2012   (KR) ......................... 10-2012-0049526

(51) Int. Cl.
| | |
|---|---|
| *G01J 1/04* | (2006.01) |
| *G02B 5/20* | (2006.01) |
| *G02B 13/00* | (2006.01) |
| *G02B 13/18* | (2006.01) |
| *G02B 5/28* | (2006.01) |

(52) U.S. Cl.
CPC .............. *G01J 1/0437* (2013.01); *G02B 5/282* (2013.01); *G02B 13/004* (2013.01); *G02B 13/18* (2013.01)

(58) Field of Classification Search
CPC ......... G01J 1/0437; G02B 5/20; G02B 5/201; G02B 5/204; G02B 5/208; G02B 5/22–5/24; G02B 5/28–5/282; G02B 9/00–9/64; G02B 13/001; G02B 13/008; G02B 13/14; G02B 13/18
USPC ......... 359/350, 355, 356, 357, 359, 362, 363, 359/365, 366, 708–718, 722, 723, 738, 359/754–795; 348/335, 342, 360

See application file for complete search history.

(56) References Cited

U.S. PATENT DOCUMENTS

| | | | |
|---|---|---|---|
| 4,787,721 A * | 11/1988 | Fukushima et al. | 359/713 |
| 6,985,306 B2 * | 1/2006 | Abe | 359/716 |
| 2005/0068456 A1 | 3/2005 | Ohta et al. | |
| 2007/0177280 A1 | 8/2007 | Hirayama | |
| 2009/0050946 A1 | 2/2009 | Duparre et al. | |
| 2012/0057071 A1 | 3/2012 | Yoneyama et al. | |

OTHER PUBLICATIONS

Devore, J.R., "Refractive Indices of Rutile and Sphalerite," Journal of the Optical Society of America, vol. 41, No. 6, Jun. 1951.*
European Search Report dated Jul. 2, 2013 in connection with European Patent Application No. 13166831.1, 7 pages.

* cited by examiner

*Primary Examiner* — Stephone B Allen
*Assistant Examiner* — Adam W Booher

(57) ABSTRACT

An image sensor module includes: an image sensor having an image surface; a plurality of lenses arranged sequentially from an object side to the image surface side, each of the lenses refracting an incident light; and at least one infrared cut-off filter configured to cut off an infrared component from the incident light. At least one surface of the infrared cut-off filter has a concave shape in relation to the object side.

12 Claims, 3 Drawing Sheets

IMAGE SENSOR MODULE HAVING CURVED INFRARED CUT-OFF FILTER

CROSS-REFERENCE TO RELATED APPLICATION(S) AND CLAIM OF PRIORITY

The present application is related to and claims the priority under 35 U.S.C. §119(a) to Korean Application Serial No. 10-2012-0049526, which was filed in the Korean Intellectual Property Office on May 10, 2012, the entire content of which is hereby incorporated by reference.

TECHNICAL FIELD

The present disclosure relates to a lens system having a plurality of lenses, and more particularly to an image sensor module having an infrared cut-off filter.

BACKGROUND

An image sensor module includes a lens system having a plurality of lenses and an infrared cut-off filter, and an image sensor, in which the infrared cut-off filter functions to cut off an infrared component from an incident light.

FIG. 1 illustrates a lens system 100 provided with an infrared cut-off filter. The lens system 100 includes first to third lenses 110, 120 and 130, and an infrared cut-off filter 140 which are arranged in this order from an object side to an image surface 150 side. For example, the image surface 150 can be a light receiving surface of an image sensor.

Each of the first to third lenses 110, 120 and 130 refracts an incident light, and to form an image of a subject on the image surface 150. The infrared cut-off filter 140 cuts off an infrared component from the incident light. The infrared cut-off filter 140 is implemented by laminating a multi-layered infrared cut-off layer on one side or each side of a glass substrate with opposite flat sides. The infrared cut-off filter 140 is designed in such a manner that infrared lights reflected from the layers of the infrared cut-off layer are destructively interfered with each other to disappear.

FIG. 2 illustrates a transmittance characteristic of the infrared cut-off filter 140. In FIG. 2, the horizontal axis indicates wavelength, and the vertical axis indicates transmittance. FIG. 2 shows a transmittance graph 160 for a white light, of which the incident angle is zero (0) degrees with reference to the normal line of the infrared cut-off filter 140, and a transmittance graph 170 for a white light, of which the incident angle is twenty (20) degrees with reference to the normal line. As illustrated, it will be appreciated that as the incident angle is increased, a cut-off wavelength in the long wavelength side shifts to the short wavelength side. This means that as the incident angle is increased, the red components of lights passing the infrared cut-off filter 140 are reduced. This causes a phenomenon that makes a central area on the light receiving surface of the image sensor appear redder than a peripheral area on the light receiving surface.

As described above, the infrared cut-off filter has a transmittance characteristic sensitive to the incident angle. However, infrared cut-off filters are designed based on a vertically incident light. When such an infrared cut-off filter is applied to an image sensor module, there arises a problem in that the central area on the light receiving surface of the image sensor appears redder than the peripheral area on the light receiving surface. In order to solve this problem, in the process of regulating the white balance of the image sensor, a gain value of the peripheral area of the image sensor is set to be higher than that of the central area of the image sensor in consideration of the relative illumination of the lens system and the transmittance characteristic of the infrared cut-off filter. However, this causes a problem of increasing noise.

SUMMARY

To address the above-discussed deficiencies, the present disclosure includes an image sensor module having an infrared cut-off filter capable of suppressing a cut-off wavelength shift phenomenon according to the variation of incident angle.

According to another aspect of the present disclosure, there is provided an image sensor module including: an image sensor having an image surface; a plurality of lenses arranged sequentially from an object side to the image surface side, each of the lenses refracting an incident light; and at least one infrared cut-off filter configured to cut off an infrared component from the incident light. At least one side of the infrared cut-off filter has a concave shape in relation to the object side.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

The above and other embodiments, features, and advantages of the present disclosure will be more apparent from the following detailed description taken in conjunction with the accompanying drawings, in which.

DETAILED DESCRIPTION

Figure 1:
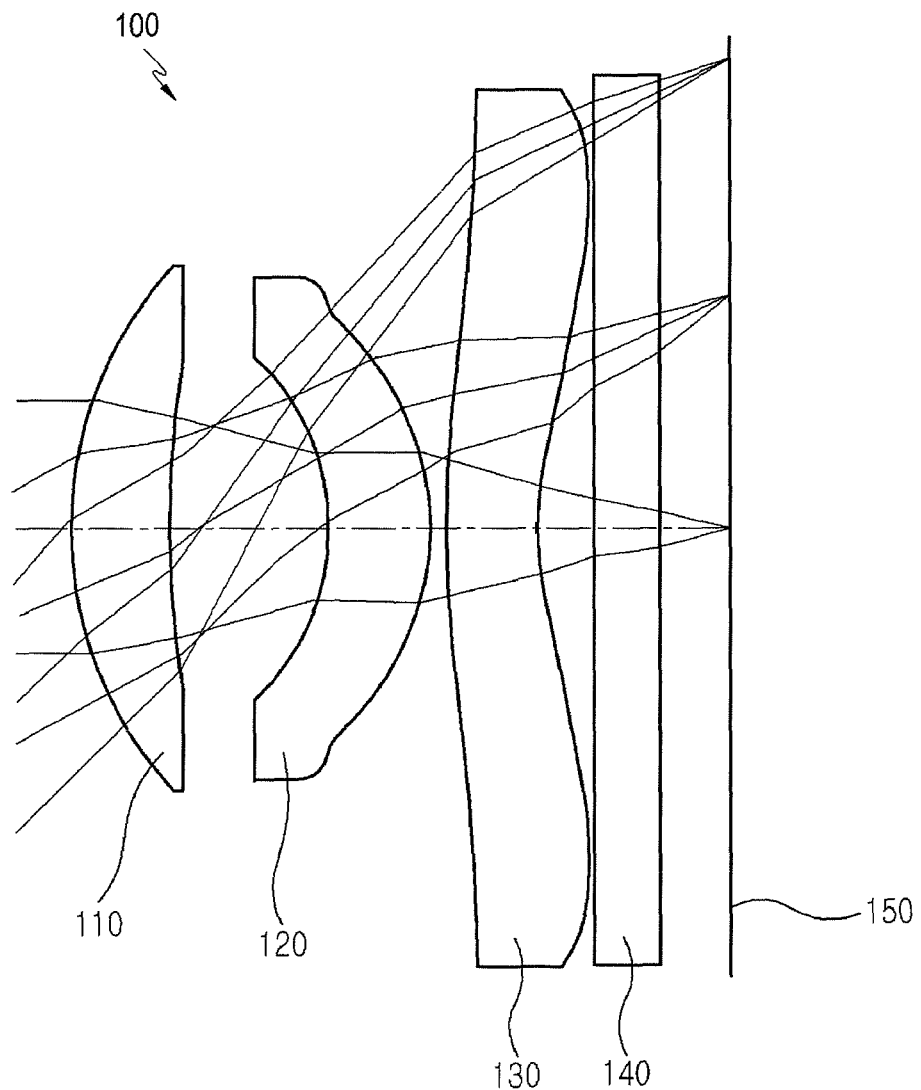
FIG. 1 illustrates a lens system including an infrared cut-off filter according to the present disclosure.
Figure 2:
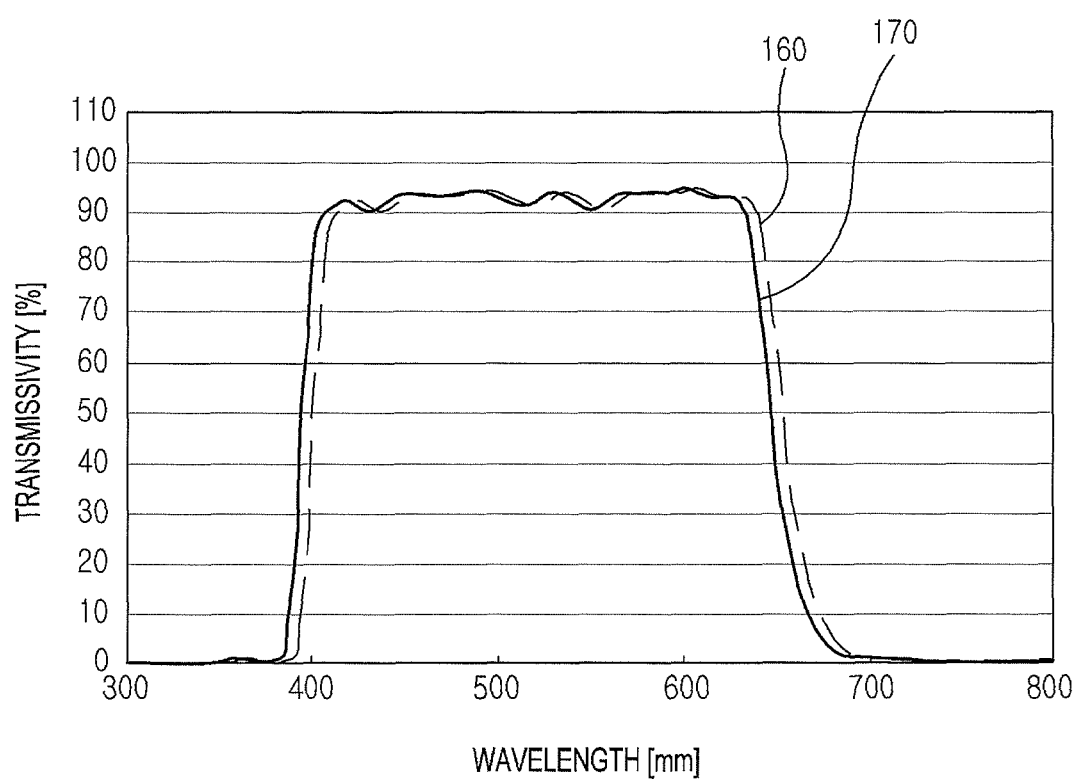
FIG. 2 illustrates a transmittance characteristic of the infrared cut-off filter illustrated in FIG. 1.
Figure 3:
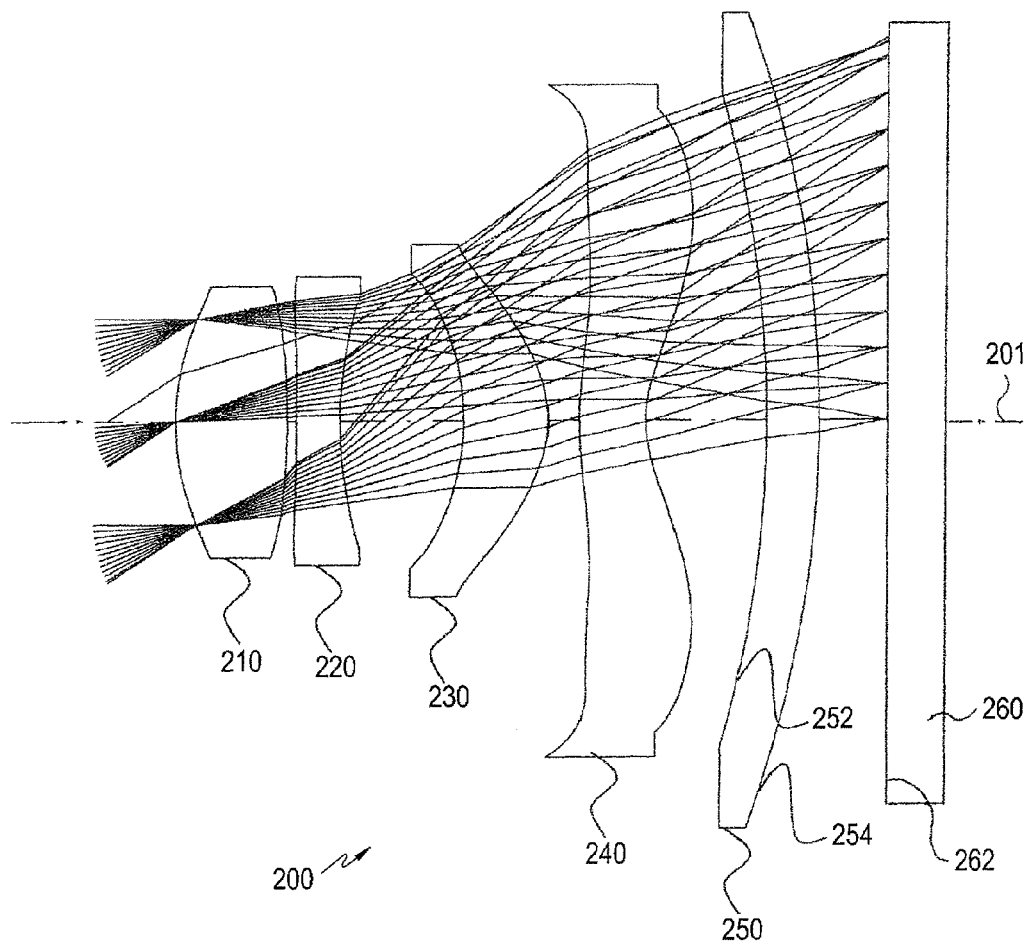
FIG. 3 illustrates an image sensor module including an infrared cut-off filter according to embodiments of the present disclosure.

FIG. 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged image sensor module. Hereinafter, various embodiments of the present disclosure will be described with reference to the accompanying drawings. In the following description, various specific matters, for example, detailed constituent elements are provided only to help general understanding of the present disclosure. However, it will be apparent to those skilled in the art that various changes or modifications can be made to the specific matters within the scope of the present disclosure. Further, in the following description, a detailed description of known functions and configurations incorporated herein will be omitted when it may make the subject matter of the present disclosure rather unclear.

Ordinal numbers, such as first and second, are used in the following description of the embodiments of the present disclosure merely to differentiate objects with the same name. However, the order of the objects may be optionally determined, and a description for a preceding object may be applied to a post-order object.

FIG. 3 illustrates an image sensor module including an infrared cut-off filter according to embodiments of the present disclosure.

The image sensor module 200 includes a first lens 210, a second lens 220, a third lens 230, a fourth lens 240, an infrared cut-off filter (IR filter) 250, and an image sensor 260 arranged on an optical axis 201. Generally, optical axis means an axis which does not cause an optical variation of a corresponding optical device even if the optical device is rotated about the axis. The description, "arranged on the optical axis," means that the center of curvature, the point of symmetry (i.e., the center of symmetry) or the center of a corresponding optical device is positioned on the optical axis.

The first to fourth lenses 210, 220, 230 and 240 form an image of a subject positioned within the view angles of the first to fourth lenses 210, 220, 230 and 240 on the image surface 262 of the image sensor 260. The infrared cut-off filter 250 cuts off an infrared ray that has passed through the first to fourth lenses 210, 220, 230 and 240, and the image sensor 260 converts the optical image formed by the light that has passed through the infrared cut-off filter 250 into an electric image signal.

The image sensor 260 includes a plurality of pixel units arranged in a M×N matrix structure, in which the pixel units may include a photodiode and a plurality of transistors. The pixel units accumulate electric charges produced by an incident light. A voltage by the accumulated electric charges represents the intensity of illumination of the incident light. In processing an image that constitutes a still picture or a moving picture, the image signal output from the image sensor 260 is configured by a set of voltages (i.e., pixel values) output from the pixel units, and the image signal represents a signal frame (i.e., a still picture). In addition, the frame is configured by M×N pixels.

Table 1 below indicates numerical data of optical devices that constitute the image sensor module 200. Table 1 shows a surface number, i, a curvature radius of the $i_{th}$ optical surface (Si), r, a thickness of the $i_{th}$ optical surface or air gap (or a distance from the $i_{th}$ optical surface to the $(i+1)_{th}$ optical surface), t, a refractive index at d line (587.5618 nm) of the $i_{th}$ optical surface, nd, and an Abbe number of the $i_{th}$ optical surface, v. In addition, the unit of the curvature radius and thickness in mm. The number of an optical surface, i, is denoted sequentially from the subject (i.e., an object) side to the image sensor (i.e., the image surface 262). For example, in the first lens 210, the first optical surface may be referred to as an object side optical surface, and the second optical surface may be referred to as an image side optical surface. The mark (*) indicated before the number of an optical surface represents that the corresponding optical surface is an aspherical surfaces. The other optical surfaces without the mark (*) are spherical surfaces. It is assumed that the subject is a circular object positioned at an infinite distance. Although not illustrated, an iris or a stop with a circular aperture can be arranged between any two adjacent lenses among the first to fourth lenses 210, 220, 230, and 240. The iris controls the amount of light incident to a lens positioned behind the iris through the circular aperture provided at the central area of the iris.

TABLE 1

| Surface No. | Surface shape | Curvature radius (r) | Thickness (t) | Refractive index (nd) | Abbe No. (v) | Remarks |
| --- | --- | --- | --- | --- | --- | --- |
| *1 | Aspherical | 1.67 | 0.65 | 1.53 | 55.8 | First lens |
| *2 | Aspherical | −5.93 | 0.05 | | | |
| *3 | Aspherical | −100 | 0.25 | 1.639 | 23.4 | Second lens |
| *4 | Aspherical | 2.69 | 0.71 | | | |
| *5 | Aspherical | −1.68 | 0.5 | 1.530 | 55.8 | Third lens |
| *6 | Aspherical | −0.78 | 0.18 | | | |
| *7 | Aspherical | 2.77 | 0.381 | 1.530 | 55.8 | Fourth lens |
| *8 | Aspherical | 0.82 | 0.7 | | | |
| 9 | Spherical | −8 | 0.3 | 1.53 | 55.8 | IR filter |
| 10 | Spherical | −8 | — | | | |

In Table 1, the first to eighth optical surfaces of the first to fourth lenses 210, 220, 230, and 240 are aspherical surfaces, and the ninth and tenth optical surfaces of the infrared cut-off filter 250 are spherical surfaces. That is, each of the first to fourth lenses 210, 220, 230, and 240 is a bi-aspheric lens. The image surface 262 of the image sensor 260 means a surface formed by the pixel units. If a corresponding optical surface is a flat surface, its curvature radius is indefinite, and the refractive index of air is 1. The curvature radius of each of the aspherical surfaces is a value measured at the center of the corresponding aspherical surface. The first to fourth lenses 210, 220, 230, and 240 may be formed from any commercially available materials. For example, each of the first to fourth lenses 210, 220, 230, and 240 may be formed from a raw material of, for example, "APEL" or "OKP4HT", and the infrared cut-off filter 250 may be formed from a raw material of, for example, "BK7_SCHOTT".

An aspherical surface defining equation can be represented by Equation 1 below.

$$z = \frac{ch^2}{1 + SQRT\{1 - (1+k)c^2h^2\}} + Ah^4 + Bh^6 + Ch^8 + Dh^{10} + Eh^{12} + FH^{14} + Gh^{16}$$

Equation 1

In Equation 1, z represents a distance along the optical axis from the center (or apex) of an optical surface, h represents a distance in a direction perpendicular to the optical axis 201, c represents a curvature at the center of an optical surface (a reciprocal number of a curvature radius), k is a conic coefficient, A, B, C, D, E, F, and G are aspherical surface coefficients, and G=0.

Table 2 below exemplifies aspherical surface coefficients of aspherical surfaces of Table 1.

TABLE 2

| Surface No. | k | A | B | C | D | E | F |
|---|---|---|---|---|---|---|---|
| *1 | −0.8506 | −0.005 | 0.0028 | −0.0412 | −0.0401 | 0 | 0 |
| *2 | 0 | −0.0806 | −0.0507 | 0.3428 | −0.4035 | 0 | 0 |
| *3 | −0.09 | −0.0458 | 0.3519 | −0.0392 | −0.2944 | 0.0674 | 0 |
| *4 | −8.36 | 0.0344 | −0.0213 | −0.1185 | 0.3098 | −0.1245 | −0.0249 |
| *5 | −6.955 | −0.1294 | −0.0525 | 0.0561 | −0.0532 | −0.0471 | −0.0277 |
| *6 | −3.4521 | −0.1659 | 0.02928 | −0.0652 | 0.0368 | 0.0233 | −0.0105 |
| *7 | 0 | −0.186 | 0.0678 | −0.0088 | 0.0004 | −0.002 | 0.00003 |
| *8 | −5.570 | −0.1099 | 0.0431 | −0.0138 | 0.0022 | 0.00004 | −0.00004 |

Herein below, the descriptions as to the shapes of optical surfaces are made with reference to Tables 1 and 2. However, each of the optical surfaces of the optical devices that constitute the image sensor module 200 can be spherical or aspherical.

Each of the first to fourth lenses 210, 220, 230, and 240 functions to refract an incident light, and forms an image of a subject on the image surface 262.

The first lens 210 has a positive refractive power, and has first and second convex-convex (i.e., bi-convex) optical surfaces when based on the direction directed from the subject side to the image sensor 260 side), and each of the first and second optical surfaces is an aspherical surface.

The second lens 220 has a negative refractive power, and has third and forth bi-concave optical surfaces, each of which is an aspherical surface.

The third lens 230 has a positive refractive power, and has fifth and sixth concave-convex optical surfaces, each of which is an aspherical surface.

The forth lens 240 is a meniscus lens, and has seventh and eighth convex-concave optical surfaces, each of which is an aspherical surface. The seventh optical surface is convex at the central area and concave at the peripheral area, and the eighth optical surface is concave at the central area and convex at the peripheral area.

The infrared cut-off filter 250 functions to cut off an infrared component from incident light. The infrared cut-off filter 250 has ninth and tenth concave-convex optical surfaces, each of which is a spherical surface. The infrared cut-off filter 250 includes first and second infrared cut-off layers 252 and 254 that are laminated on the ninth and tenth concave-convex optical surfaces, respectively. Each of the first and second infrared cut-off layers 252 and 254 may be formed by a plurality of constituent layers in which at least adjoining constituent layers have different refractive indexes. Each of the first and second infrared cut-off layers 252 and 254 is configured in such a manner that infrared lights reflected from the constituent layers are destructively interfered with each other to disappear. The infrared cut-off filter 250 may be formed by laminating a multi-layered infrared cut-off layer on one surface or each surface of a concave-convex transparent glass substrate or transparent plastic substrate. The substrate is formed from a glass or a plastic material, and at least one side of the substrate has a concave shape in relation to the object side. The data of Table 1 represents a concave-convex glass substrate. In addition, the infrared cut-off filter 250 preferably has the focal distance of not less than 100 mm.

The infrared cut-off filter 250 according to the present disclosure has an effect of reducing the maximum incidence angle as compared to a flat infrared cut-off filter because the infrared cut-off filter 250 includes the first and second infrared cut-off layers 252 and 254 laminated on the ninth and tenth optical surfaces which are concave when viewed from the object side. In addition, the infrared cut-off filter 250 has an effect of suppressing the cut-off wavelength shift phenomenon according to the variation of an incidence angle. Preferably, the infrared cut-off filter 250 has a curvature (or a curvature radius) set in such a manner that the maximum incidence angle of light in relation to the image sensor module 200 is not more than 15 degrees. In such a condition, the difference in red color between the central area and the peripheral area on the image surface 262 of the image sensor 260 arrives at a negligible level.

An image sensor module 200 with the curved infrared cut-off filter 250 has an advantage in that because the image sensor module 200 can minimize the cut-off wavelength shift phenomenon according to the variation of an incidence angle, which allows the gain value of the peripheral area of the image sensor to be set low as compared to an image sensor module without a curved infrared cut-off filter, the noise can be reduced. In addition, the image sensor module 200 with the curved infrared cut-off filter 250 has an advantage in that the image sensor module 200 can express colors of various light sources with a single white balance adjustment value.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An image sensor module comprising:
   an image sensor having an image surface;
   a plurality of lenses arranged sequentially from an object side to the image surface side, each of the lenses configured to refract an incident light from the object side; and
   at least one infrared cut-off filter configured to cut off an infrared component from the incident light, opposite surfaces of the at least one infrared cut-off filter having a same curvature radius of not less than 8 millimeters (mm) configured such that a maximum incidence angle of light in relation to the image sensor is not more than 15 degrees and the at least one infrared cut-off filter has a focal distance of not less than 100 mm;

wherein opposite surfaces of the at least one infrared cut-off filter have a same concave shape in relation to the object side, wherein the plurality of lenses include:
   a first lens having a positive refractive power;
   a second lens having a negative refractive power;
   a third lens having a positive refractive power; and
   a fourth lens having a central area and a peripheral area which are convex and concave in relation to the object side, respectively, and wherein opposite surfaces of each of the plurality of lenses are aspherical surfaces, and the opposite surfaces of the at least one infrared cut-off filter are spherical surfaces.

2. The image sensor module of claim 1, wherein the at least one infrared cut-off filter includes:
   a substrate having the opposite surfaces with the same concave shape in relation to the object side; and
   a first infrared cut-off layer on one of the opposite surfaces of the substrate.

3. The image sensor module of claim 2, wherein the at least one infrared cut-off filter further includes:
   a second infrared cut-off layer disposed on the other of the opposite surfaces of the substrate.

4. The image sensor module of claim 2, wherein the substrate is formed from a glass or a plastic material.

5. The image sensor module of claim 1, wherein the first to fourth lenses are sequentially arranged from the object side to the image surface side;
   the first lens has a bi-convex shape;
   the second lens has a bi-concave shape; and
   the third lens has a concave-convex shape.

6. The image sensor module of claim 1, wherein the incident light filtered through the at least one cut-off filter forms an image of a subject on the image surface.

7. A method comprising:
   receiving light from an object side of an image sensor module, the light to be received by an image surface of an image sensor;
   receiving the light incident upon an object side surface of each of a plurality of lenses, the plurality of lenses arranged sequentially from the object side to an image surface side;
   refracting, by each of the plurality of lenses, the incident light;
   cutting off, by at least one infrared cut-off filter, an infrared component from the incident light, opposite surfaces of the at least one infrared cut-off filter having a same curvature radius of not less than 8 millimeters (mm) configured such that a maximum incidence angle of light in relation to the image sensor is not more than 15 degrees, wherein the opposite surfaces of at least one infrared cut-off filter have a same concave shape in relation to the object side;
   receiving the incident light filtered through the at least one infrared cut-off filter on the image surface; and
   generating an image signal output using the filtered light, wherein the plurality of lenses include:
a first lens having a positive refractive power;
a second lens having a negative refractive power;
a third lens having a positive refractive power; and
a fourth lens having a central area and a peripheral area which are convex and concave in relation to the object side, respectively, and wherein opposite surfaces of each of the plurality of lenses are aspherical surfaces, and the opposite surfaces of the at least one infrared cut-off filter are spherical surfaces.

8. The method of claim 7, wherein the at least one infrared cut-off filter includes:
   a substrate having the opposite surfaces with the same concave shape in relation to the object side; and
   a first infrared cut-off layer on one of the opposite surfaces of the substrate.

9. The method of claim 8, wherein the at least one infrared cut-off filter further includes:
   a second infrared cut-off layer disposed on the other of the opposite surfaces of the substrate.

10. The method of claim 8, wherein the substrate is formed from a glass or a plastic material.

11. The method of claim 7, wherein the first to fourth lenses are sequentially arranged from the object side to the image surface side;
   the first lens has a bi-convex shape;
   the second lens has a bi-concave shape; and
   the third lens has a concave-convex shape.

12. The method of claim 7, further comprising forming an image of a subject on the image surface using the filtered light.

* * * * *